United States Patent [19]

Takamura et al.

[11] Patent Number: 4,971,427
[45] Date of Patent: Nov. 20, 1990

[54] ZOOM LENS DRIVE MECHANISM OF A CAMERA

[75] Inventors: Masashi Takamura; Kiyotaka Kobayashi, both of Tokyo; Toshio Yoshida, Saitama; Masao Shoji, Saitama; Masayoshi Hirai, Saitama; Tetuo Nishizawa, Saitama, all of Japan

[73] Assignee: Fuji Photo Film Co., Ltd., Kanagawa, Japan

[21] Appl. No.: 326,501

[22] Filed: Mar. 20, 1989

[30] Foreign Application Priority Data

Mar. 18, 1988 [JP] Japan .................................. 63-65149
Mar. 18, 1988 [JP] Japan .................................. 63-65150

[51] Int. Cl.$^5$ .......................... G02B 15/00; G02B 7/02
[52] U.S. Cl. .................................. 350/429; 350/255; 354/195.12
[58] Field of Search ................................ 350/429, 255; 354/195.1, 400, 195.12

[56] References Cited

U.S. PATENT DOCUMENTS

4,747,669  5/1988  Yamada et al. ...................... 350/255
4,748,466  5/1988  Yamada et al. ...................... 354/400
4,799,073  1/1989  Asano et al. ................... 354/195.12

Primary Examiner—Bruce Y. Arnold
Assistant Examiner—Loha Ben
Attorney, Agent, or Firm—Young & Thompson

[57] ABSTRACT

A drive mechanism for a zoom lens system consisting of first and second lens groups has a movable lens barrel fixedly holding the first lens and cam structure consisting of a cam member provided on the second lens group and a cam follower member on the movable lens barrel. The movable lens barrel moves forward or rearward to shift the second lens group forward or rearward relative to the first lens group along the optical axis of the zoom lens system via the cam member so as to continuously change the focal length of the zoom lens system. The cam member is mounted on the movable lens barrel to change the curve of the cam surface relative to the cam follower member only in a middle focal length range.

8 Claims, 6 Drawing Sheets

ZOOM LENS DRIVE MECHANISM OF A CAMERA

BACKGROUND OF THE INVENTION

The present invention relates to a zoom lens drive mechanism of a camera in which a zooming cam position can be correctively adjusted in an intermediate range of the focal length after the adjustment of focus of the zoom lens for the longest and the shortest focal lengths.

Various compact cameras with zoom lenses of which the focal length can be continuously changeable have become increasingly popular by reason of the convenience of taking pictures of various subjects.

A zoom lens advantageously incorporated in compact cameras consists of a zoom lens system comprising, for example two lens means, and two lens barrels; one is movable axially relative to the camera body and the other is fixed. The movable lens barrel holds the front lens means fixedly therein and the rear lens means movably therein. The focal length of the zoom lens system is changed by either axially shifting or rotating the movable lens barrel relative to the fixed lens barrel to shift the front and rear lens means in a predetermined relationship. In addition to changing the focal length, the movable lens barrel should be otherwise shifted or rotated to focus the zoom lens system. The front and rear lens means are relatively shifted in different relationship between focusing and zooming. This is performed by a coaction of cams provided in the movable and/or fixed lens barrels and cam follower pins attached to lens holders of the front and rear lens means.

Production errors arise when assembling such zoom lenses, and so the lens system is subjected to focus tracking adjustment in order to focus the zoom lens system over the whole range of possible focal lengths thereof. Such a focus tracking adjustment is performed by changing the relative position of the cam follower member to the cam. That is, after the focus tracking adjustment for the longest and the shortest focal lengths or telephotography and wide-angle photography, respectively, the focus tracking adjustment for the intermediate focal length range is carried out by shifting the component lens means stepwise between positions suitable for telephotography and wide-angle photography. But conducting this focus tracking adjustment for the intermediate focal length range often causes a change of focus for telephotography and wide-angle photography. Therefore, such a focus tracking adjustment is quite troublesome.

OBJECTS OF THE INVENTION

It is, therefore, an object of the present invention to provide a zoom lens system drive mechanism in which the focus tracking adjustment is effected quite easily.

It is another object of the present invention to provide a zoom lens system drive mechanism in which the focus tracking adjustment of the zoom lens system over the intermediate focal length range can be carried out without causing any change of focus for telephotography and wide-angle photography.

SUMMARY OF THE INVENTION

According to a preferred embodiment of the present invention, the above and other objects are achieved by providing a drive mechanism for a zoom lens system consisting of first and second lens means, which comprises a movable lens barrel fixedly holding the first lens means and cam means consisting of a cam member and a cam follower member provided on the second lens means. The movable lens barrel moves forward or rearward to shift the second lens means forward or rearward relative to the first lens means along the optical axis of the zoom lens system by way of the cam member so as to continuously change the focus length of the zoom lens system. The cam member is rotatably mounted on the movable lens barrel for rotation about the intersection of lines normal to the surfaces in contact at the contact points between the cam surfaces of the cam and of the cam follower member for the zoom lens system having the longest and the shortest focal length, respectively, in order to change the focus of the zoom lens system over the intermediate focal length range.

According to another preferred embodiment of the present invention, the zoom lens system drive mechanism comprises a movable lens barrel fixedly holding the first lens means and cam means comprising a cam member formed with a cam surface on one side and a cam follower member provided on the second lens means. The movable lens barrel moves forward or rearward to shift the second lens means forward or rearward relative to the first lens means along the optical axis of the zoom lens system via the cam member so as to continuously change the focal length of the zoom lens system. The cam member is able to bend at its middle section so as to deflect the cam surface, thereby changing the focus of the zoom lens system in the intermediate focal length range.

DETAILED DESCRIPTION OF THE PREFERRED EMBODIMENTS

Referring now to the drawings in detail, and first to FIGS. 1 through 5, there is shown a zoom lens drive mechanism incorporated in a camera according to a preferred embodiment of the present invention. As shown, a zoom lens system in the form of a taking lens comprises first and second lens means 1 and 2, respectively, each comprising a single-element lens in this embodiment. The first lens means 1 is received in a shutter unit housing 3 attached to the inside surface of a movable lens barrel 4 with set screws 3a. In order to adjust the optical axis of the first lens means 1, there are provided spring washers 3b for two of the three set screws 3a.

Figure 1:
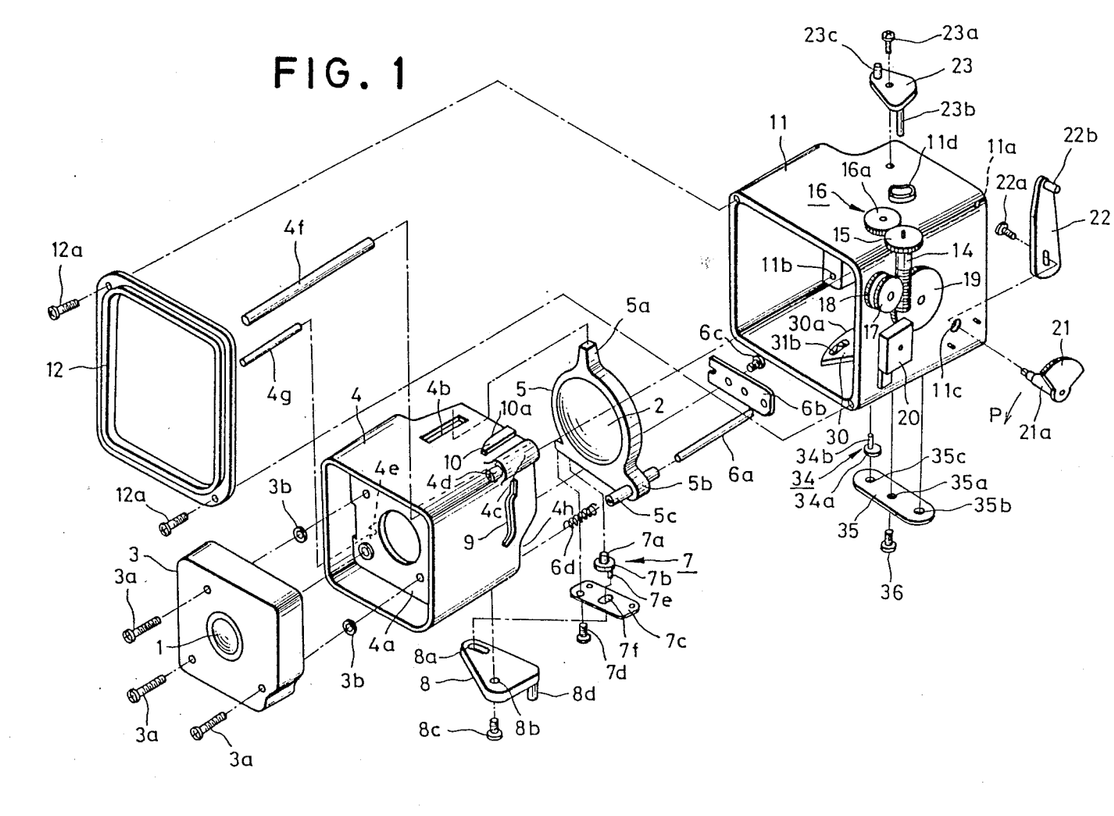
FIG. 1 is an exploded perspective view showing the essential parts of a camera including a zoom lens system drive mechanism according to a preferred embodiment of the present invention.
Figure 2:
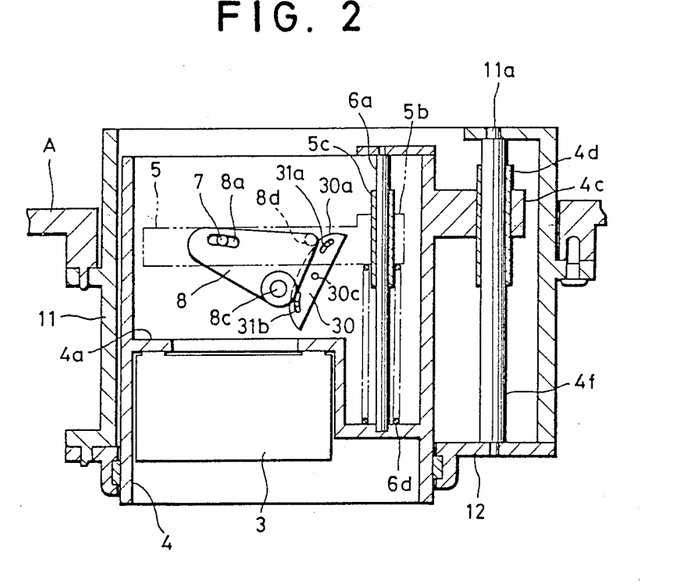
FIG. 2 is a cross sectional view of the camera of FIG. 1.

The movable lens barrel 4 is in the form of a rectangular pipe with a partition wall 4a to which the shutter unit housing 3 is attached. In the top wall of the movable lens barrel 4 there is formed a guide slot 4b parallel to the optical axis of the zoom lens system. The guide slot 4b slidably receives an upper projection 5a of a lens holder 5 holding the second lens means 2. The lens holder 5 has a lower projection 5b in which a bush 5c is fitted to receive slidably a guide rod 6a of which one end is supported by the partition wall 4a of the movable lens barrel 4 and the other end is held by a bracket 6b secured to the movable lens barrel 4 by a set screw 6c. Between the lens holder 5 and the partition wall 4a of the movable lens barrel 4 there is a coil spring 6d mounted on the guide rod 6a to urge the lens holder 5 rearward.

In association with the lens holder 5, there is focus adjustment means including a depressed recess elongated in a direction parallel to the optical axis and having a center hole perpendicular to the depressed recess (hidden in FIG. 1), formed in the bottom cut-away portion of the lens holder 5. A focus adjusting member 7 is secured to the lens holder 5 by a retaining plate 7c by screws 7d in such a way as to retain rotatably a flange 7b and a concentric pin 7a of the focus adjusting member 7 in that recess and center hole, respectively. An adjusting pin 7e of the focus adjustment member 7 eccentric to the flange 7b extends downwardly and passes through a hole 7f formed in the retaining plate 7c and is slidably received in a slot 8a formed in a triangular bell crank member 8 which is pivotally attached to the underside of the movable lens barrel 4 by means of a screw 8c that passes through a hole 8b of the bell crank member 8 and about which member 8 pivots. The bell crank member 8 is provided with a cam follower pin 8d extending downward.

The movable lens barrel 4 is formed with a cam slot 9 in a rear portion of a side wall thereof and is provided with a guide member 4c having a bush 4d with a bore along an upper edge thereof that is parallel to the optical axis. Close to the guide tube 4c the movable lens barrel 4 is provided with a cam plate 10 having a cam surface 10a formed on one side. It is to be noted that the cam plate 10 may be formed integral with the guide member 4c. In a lower portion of a wall of the barrel 4 opposite the wall in which the cam slot 9 is formed, there is a guide member 4e in the form of a U-channel which is shown by a phantom line in FIG. 1.

The movable lens barrel 4 thus constructed is supported by a square pipe-shaped fixed barrel 11 secured to the camera body A for axial movement parallel to the optical axis. For movably supporting the movable lens barrel 4, there are guide rods 4f and 4g passing through the bushes 4d of the guide members 4c and 4e. The rear ends of the guide rods 4f and 4g are secured to a rear supporting lugs 11a extending downward from the top wall of the fixed barrel 11 and a side supporting lug 11b extending laterally inward from the fixed lens barrel 11. The fixed barrel 11 has a square frame 12 attached to its front end by screws 12a.

The bottom wall of the fixed barrel 11 is provided with a cam plate 30 having a cam surface 30a formed on one side which is engaged by the follower pin 8d of the bell crank lever 8. The coaction of the cam plate 30 and the cam follower pin 8d will be described in detail later.

On the outer side of a vertical wall of the fixed barrel 11 there is a power train including a worm 14 having a vertical axis of rotation whose upper end is above the top wall of the fixed barrel 11 and has attached thereto a drive spur gear 15 in mesh with a gear train 16 including a gear 16a which is provided on the top wall of barrel 11 and transmits rotation from a motor (not shown) to the drive spur gear 15 with an appropriate reduction ratio. In mesh with the worm 14 is a worm wheel 17 rotatably mounted on the outer side of that vertical side wall of the fixed barrel 11. A transmission gear 18 is provided also on that outer side coaxial with the worm wheel 17. The worm wheel 17 is usually frictionally coupled to the transmission gear 18 but one will stop while the other continues to rotate upon the application of a predetermined load between the worm wheel 17 and the gear 18.

The transmission gear 18 is operationally coupled to a sector gear 21 for driving an encoder 20 through an intermediate gear 19 in mesh with the transmission gear 18. A shaft 21a of the sector gear 21 passes through a bore 11c formed in the side wall of the fixed barrel 11 and a cut-away portion 4h of the movable lens barrel 4 and the end of shaft 21a is located inside the movable lens barrel 4 received in the fixed barrel 11. To the end of the shaft 21a, the lower end of an input lever 22 is secured with a screw 22a, so as to synchronize the rotation of the sector gear 21 with that of the input lever 22. The input lever 22 is provided with a drive pin 22b oriented toward the sector gear 21, and this pin 22b is in slidable engagement with the cam slot 9 formed in the side wall of the movable lens barrel 4.

The top wall of fixed barrel 11 is formed with an opening 11d that overlies the cam plate 10; and that top wall of the fixed lens barrel 11 is also provided with a cooperating plate 23 attached swingably thereto substantially at the center of the cooperating plate 23 by a screw 23a. The cooperating plate 23 is provided with a follower pin 23b extending downward at one end which passes through the opening 11d and is forced to engage with the cam surface 10a of the cam plate 10 by means of a spring (not shown); and plate 23 also has a pin 23c extending upward at the opposite end which coacts with a magnifying mechanism of a finder (not shown). It is to be noted that the cooperating plate 23 can be pivotally mounted on the camera body or the finder casing.

Figure 3:
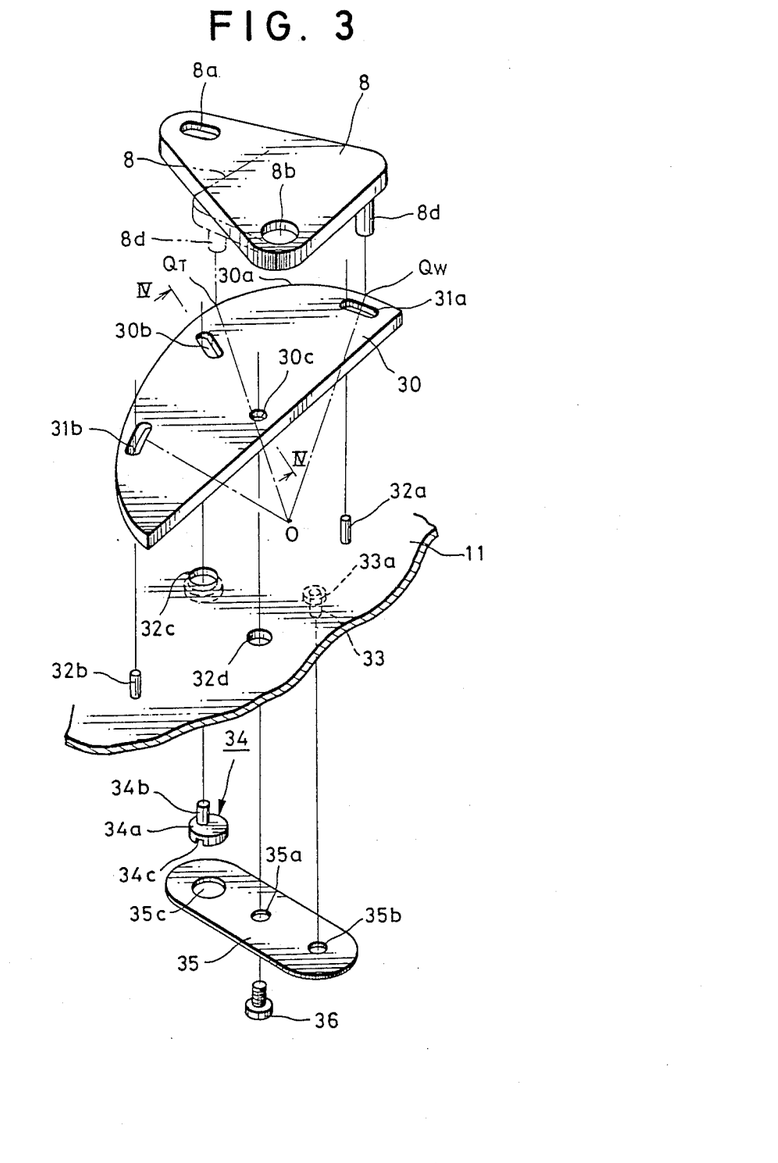
FIG. 3 is an exploded perspective view showing the focus adjusting mechanism of FIG. 1.
Figure 4:
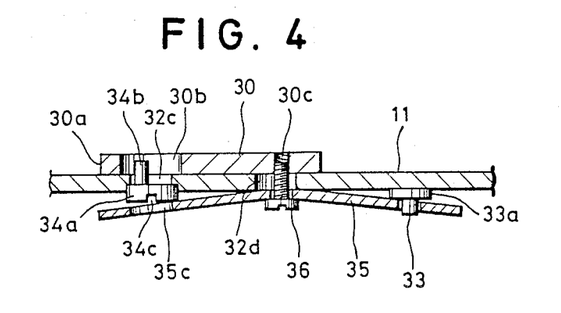
FIG. 4 is a cross sectional view taken on the line IV—IV of FIG. 3.
Figure 5:
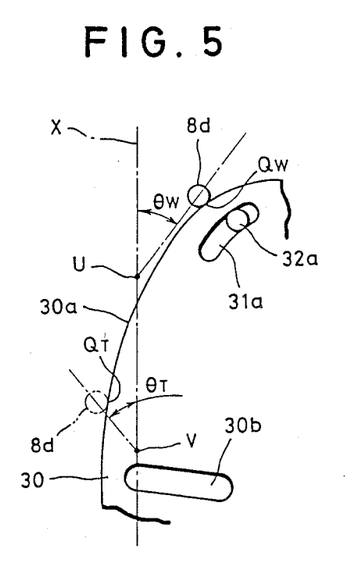
FIG. 5 is an explanatory illustration showing the positional relationship between a cam surface and the focus adjusting pin.

Referring to FIGS. 3 and 4 showing the focus adjusting mechanism, the bell crank member 8 is depicted by a solid line when the zoom lens system is adjusted for wide-angle photography and by a double-dotted line when the zoom lens system is adjusted for telephotography. Upon axial movement of the movable lens barrel 4, the cam follower pin 8d of the bell crank member 8 is displaced by the cam surface 30a of the cam plate 30. In FIGS. 3 and 5, the contact point between the cam follower pin 8d and the cam surface 30a is represented by reference character $Q_W$ when the zoom lens system is adjusted for wide-angle photography and by reference character $Q_T$ when the zoom lens system is adjusted for telephotography. The intersection of the lines normal to cam surface 30a at the contact points $Q_W$ and $Q_T$ is represented by reference character 0.

The cam plate 30 is formed with first and second circularly arcuate cam slots 31a and 31b having their centers interconnected with the intersection Q by imaginary lines spaced angularly from each other substantially at a right angle. These first and second cam slots 31a and 31b receive first and second guide pins 32a and 32b secured to the inside of the fixed barrel 11, respectively. The cam plate 30 is also formed with a radial slot 30b extending toward the intersection Q, and a bore 30c with female threads radially spaced from the cam surface 30a.

The fixed barrel is formed with a stepped or shouldered hole 32c and a hole 32d having a diameter greater than that of the threaded hole 30c, at locations on the fixed barrel 11 corresponding to those of the radial slot 30b and the threaded hole 30c of the cam plate 30, respectively. An engaging pin 33 with a shoulder 33a is secured to the outer surface of the fixed barrel 11. The stepped hole 32c, as is clearly shown in FIG. 4, receives a flange 34a of a cam plate adjusting disk 34 with an eccentric pin 34b mounted thereon. The outer diameter of the flange 34a of the cam plate adjusting disk 34 is substantially equal to the larger inner diameter of the stepped hole 32c so that the cam plate adjusting disk 34 is rotatably within the stepped hole 32c and the upper surface of the cam plate adjusting disk 34 projects outside the outer surface of the fixed lens barrel 11. The eccentric pin 34b projects inside the fixed barrel 11 within the slot 30b of the cam plate 30. The flange 34a of the cam plate adjusting disk 34 is formed with a groove 34c for receiving the tip of a screw driver.

The fixed barrel 11 is provided with a leaf spring 35 secured to the outer surface thereof. A screw 36 passes through a central hole 34a of the leaf spring 35 and the hole 32d of the fixed barrel 11, and is screwed into the threaded hole 30c of the cam plate 30 to fasten the leaf spring 35. The leaf spring 35 is formed, in one end portion, with a hole 35b in which the engaging pin 33 is received, and in the other end portion with an access hole 35c having a diameter less than that of the flange 34a of the cam plate adjusting disk 34.

In the operation of the zoom lens with the drive mechanism thus constructed, the motor rotates, rotating the drive spur gear 15, and hence the worm 14, through the gear train 16. The worm wheel 17 in mesh with the worm 14 rotates accordingly, forcing consequently the transmission gear 18 frictionally coupled to the worm wheel 17 to rotate. The rotation of the transmission gear 18 is transmitted to the sector gear 21 through the intermediate gear 19 so as to turn gear 21 in the counterclockwise direction shown by an arrow P in FIG. 1, about the shaft 21a of the sector gear 21. The direction of rotation in which the motor rotates to cause the sector gear 21 to turn in the counterclockwise direction is hereinafter referred to as the normal direction of rotation.

As a result of this normal rotation of the sector gear 21, the input lever 22 coaxial with the sector gear 21 turns simultaneously in the normal direction so as to move the drive pin 22b in the normal direction along the cam slot 9 along a circular path having its center at the axis of rotation of the shaft 21a of the sector gear 21. This forces the movable lens barrel 4 with the first lens group 1 and the shutter unit housing 3 to move forward relative to the fixed barrel 11 along the guide rods 4f and 4g.

Upon forward movement of the movable lens barrel 4, the bell crank member 8 pivotally mounted on the movable lens barrel 4 moves in the same direction through the same distance as the movable lens barrel 4 relative to the fixed barrel 11. This forward movement causes the counterclockwise rotation of the bell crank member 8 guided along the cam surface 30a of the cam plate 30. On the other hand, the counterclockwise rotation of the bell crank member 8 forces the lens holder 5 holding the rear lens means 2 to move forward relative to the movable barrel 4 against the action of the spring 6d, via the focus adjusting pin 7. Therefore, the rear lens means 2 shifts forward with respect to the movable barrel 4, reducing its distance from the front lens means 1, thereby changing the focal length of the zoom lens system. At the forward extremity of the movement of the movable lens barrel 4, the rear lens means 2 is at its closest approach to the front lens means 1, thereby setting the zoom lens system to the longest focal length.

At this time, the drive pin 22b is positioned in the lower cam section of the cam groove 9, and the front end of the movable lens barrel 4 projects from the fixed barrel 11. The optical relationship between the front and rear lens means 1 and 2 depends on and is maintained by the cam profile of the cam surface 30a of the cam plate 30.

If the motor rotates in the reverse direction, the movable lens barrel 4 moves rearward. Specifically, the reverse rotation of the motor forces the sector gear 21, and hence the input lever 22 with the drive pin 22b in the upper cam section of the cam slot 9, to turn in the clockwise direction as viewed in FIG. 1, moving rearward the movable lens barrel 4 into the fixed barrel 11.

The lens holder 5 is continuously urged rearward by the coil spring 6d, and the bell crank member 8 with the focus adjusting pin 7 coacting with the lens holder 5 is forced to bring the cam follower pin 8d into contact with the cam surface 30a of the cam plate 30. The bell crank member 8 is therefore forced to turn in the clockwise direction about the screw 8c upon retracting movement of the movable lens barrel 4, thereby moving the adjusting pin 7e of the focus adjusting member 7 in the same direction to shift rearward the lens holder 5 relative to the movable lens barrel 4. If necessary, the focus adjusting member 7 is turned to shift the lens holder 5 holding the rear lens group 2 along its optical axis, so as to finely adjust the focus of the zoom lens system. After the fine focus adjustment, the retaining plate 7c is fastened with the screw 7d to fix the focus adjusting member 7 in the turned position.

Following the focus tracking of the zoom lens for wide-angle photography and for telephotography, the zoom lens system is, if necessary, subjected to adjusting the focus of the zoom lens system in an intermediate focal length range. For this adjustment, the cam plate adjusting disk 34 is turned by use of a screwdriver inserted into slot 34c through the access hole 35c formed in the leaf spring 35, thereby turning the eccentric pin 34 b in the slot 30b of the cam plate 30 so as to displace the cam plate 30. This displacement of the cam plate 30 takes place as a rotational movement about the intersection O. The rotational movement of the cam plate 30 changes the relative position of the cam surface 30a to the cam follower pin 8d. That is, the front and rear lens means 1 and 2 are brought to a different positional relationship in the intermediate focal length range. In the course of this intermediate focal tracking, since the cam plate 30 turns about the intersection 0 of the normal lines at the contact points $Q_W$ and $Q_T$, the focus of the zoom lens for wide-angle photography or for telephotography is substantially unchanged as long as the rotational movement of the cam plate 30 is slight. It is to be understood that in practice the contact points between the cam surface 30a and the cam follower pin 8d will not always coincide with the predetermined contact point $Q_W$ for wide-angle photography or with the predetermined contact point $Q_T$ for telephotography; however, the difference is within an acceptable tolerance.

As is shown in FIG. 5, when the cam plate 30 is so disposed that the cam surface 30a overlies the optical axis X in such a way as to make angles $\theta_W$ and $\theta_T$ equal to each other, focusing errors are distributed on both sides of the predetermined contact point $Q_T$ and $Q_W$ according to the rotational movement of the cam plate 30 in the intermediate focal length range and, therefore, will fall within acceptable limits. The angle $\theta_W$ is defined between the optical axis X of the zoom lens system and a straight line passing through and perpendicular to the center axis of the cam follower pin 8d and the center U of the rear lens means 2 in the position for wide-angle photography. Similarly, the angle $\theta_T$ is defined between the optical axis X of the zoom lens system and a straight line passing through and perpendicular to the central axis of the cam follower pin 8d and the center V of the rear lens means 2 in the position for telephotography.

In such a way, the rear lens means 2 is positioned at a desired axial position relative to the front lens means 1 without changing the distance between the axis of rotation of the bell crank member 8 and the adjusting pin 7e, so as to finely adjust the focus of the zoom lens system in the intermediate focal length range. After the focus tracking in the intermediate focal length range, the screw 36 is tightened to bend the middle portion of the leaf spring 35 so as to space the ends of spring 35 farther from the fixed barrel 11, thereby imparting a restoring force to the leaf spring 35.

Figure 6:
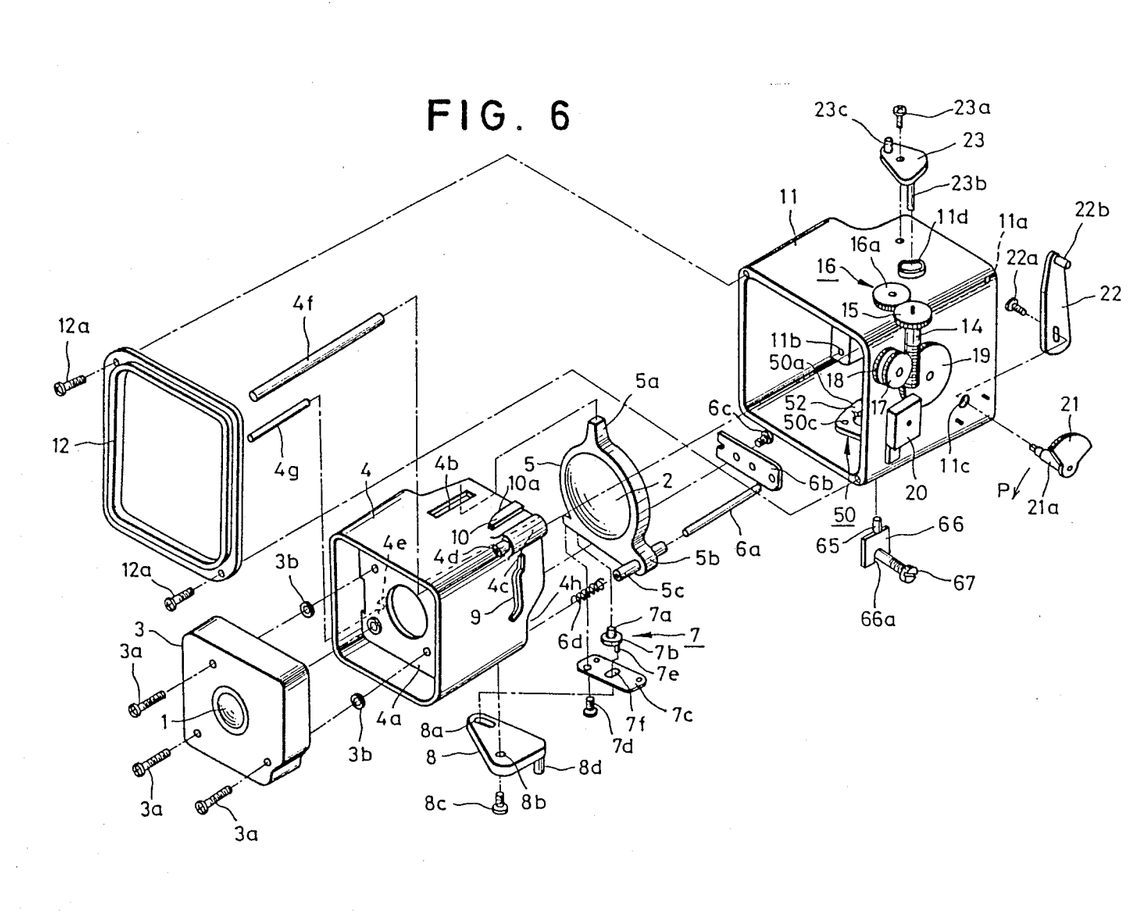
FIG. 6 is an exploded perspective view, similar to FIG. 1, showing the essential parts of a camera including a zoom lens system drive mechanism according to another preferred embodiment of the present invention.
Figure 7:
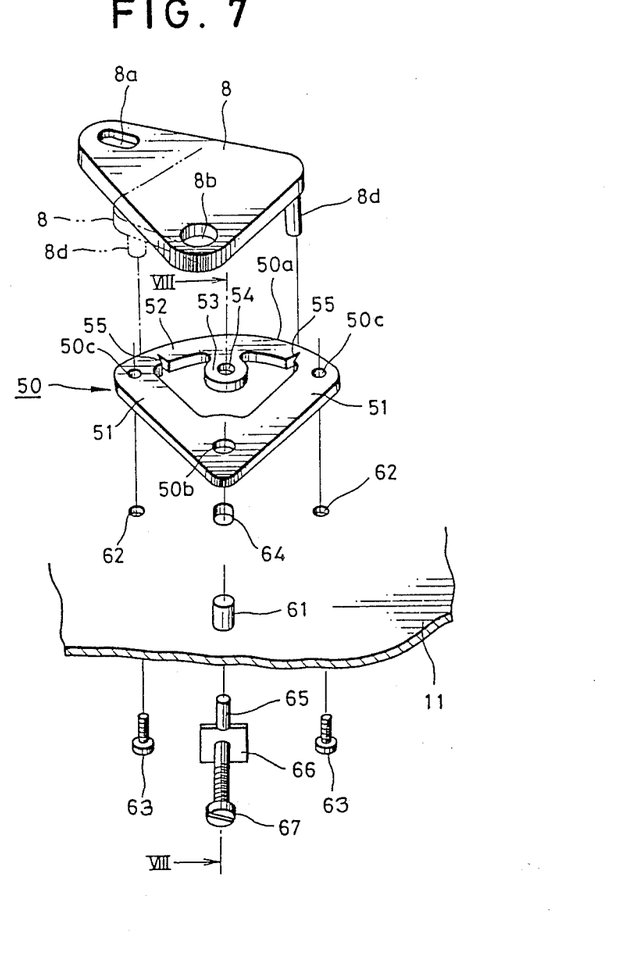
FIG. 7 is an exploded perspective view, similar to FIG. 3, showing the focus adjusting mechanism of FIG. 6.
Figure 8:
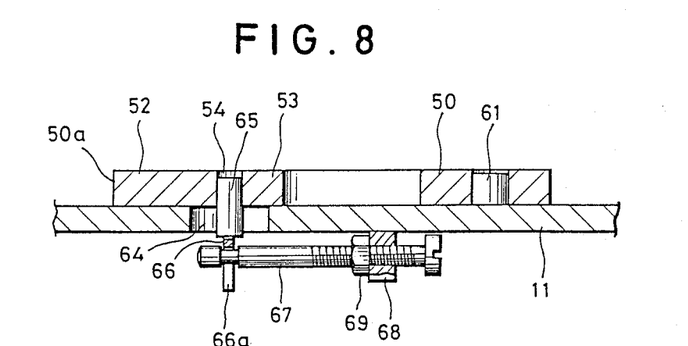
FIG. 8 is a cross sectional view taken on the line VIII—VIII of FIG. 7.

Referring to FIGS. 6 to 8, a variant of the zoom lens drive mechanism shown in FIGS. 1 through 5 is shown, in which the cam plate 30 and its associated elements area replaced by a cam member 50 and its associated elements. Because the other parts are identical in operation and structure to those shown in FIGS. 1 through 5, the following description will be directed only to the cam member 50 and its associated elements.

As is shown, the cam member 50 has first and second integral arms 51 and a cam section 52, which comprise the three sides of a triangular frame. The cam section 52 of the cam member 50 is formed with an arcuate cam surface 50a on an outer side. The intersection of the first and second arms 51 of the cam member 50 is formed with a hole 50b for receiving a pivot pin 61 secured to the inner surface of the bottom wall of the fixed barrel 11. Similarly, each intersection of the cam section 52 and the first or the second arm 51 is formed with a hole 50c with female threads. The inner side of the cam section 52 is formed at its middle with a bracket 53 having a central hole 54 used for adjusting the focus of the zoom lens system. Each end of the inner side of the cam section 52 of the cam member 50 is formed with a V-shaped groove 55. The cam section 52 of the cam member 50 is so formed as to be radially deflectable or bendable. For this purpose, the materials and dimensions of the cam member 50 may be suitably selected and designed.

The fixed barrel 11 is formed with through holes 62 which are aligned with the threaded holes 50c formed in the cam member 50, respectively. Screws 63 fasten the cam member 50 to the bottom wall of the fixed barrel 11. The bottom wall of the fixed barrel 11 is formed with a slot 64 extending in the direction of deflection of the cam section 52 of the cam member 50. A focus adjusting pin 65 extending through the slot 64 is received in the focus adjusting hole 54.

The focus adjusting pin 65 is integrally formed with a bearing plate 66 at its lower end. The bearing plate 66 is formed with an open ended slot 66a in which an end of a focus adjusting rod 67 with threads is rotatably received but which is axially fixed relative to the bearing plate 66. The threaded portion of the focus adjusting rod 67 is screwed in a threaded bracket 68 extending down from the bottom wall of the fixed barrel 11 as is shown in FIG. 8. The focus adjusting rod 67 is fastened and locked with a lock nut 69.

In the zoom lens driving mechanism of this embodiment, the tracking adjustment of the focus of the zoom lens system for wide-angle photography and telephotography, as well as the tracking adjustment of the focal length of the zoom lens system, can be performed in the same way as in the zoom lens driving mechanism of the previous embodiment.

If the zoom lens system needs a tracking adjustment of focus in an intermediate focal length range, the focus adjusting rod 67 is turned to move or shift it forward or rearward with respect to the bracket 68. If the focus adjusting rod 67 is turned so as to move it forward, the focus adjusting pin 65 secured to the integral bearing plate 66 moves forward in the slot 64, so that the cam section 52 of the cam member 50 is bent outward, deforming the curve of the cam surface 50a. In such a way, the focus of the zoom lens system in the intermediate focal length is suitably adjusted according to the amount of deflection of the cam surface 50a.

External force is applied to the middle section of the cam section 52 of the cam member 50 fixed at the opposite ends of the cam member 50 with screws 63, whereby the cam section 52 is adapted to bend at its middle section, so that the middle portion of cam surface 50a of the cam section 52 undergoes a limited deflection. Therefore, fixing the contact points between the cam follower pin 8d and the cam surface 50a of the cam section 52 at the opposite ends of the cam surface 50a of the cam section 52 for wide-angle photography and telephotography, respectively, enables performing tracking adjustment of the focus of the zoom lens system in the intermediate focal length range after the tracking adjustment of focus for wide-angle photography and telephotography.

After this focus tracking adjustment, the lock nut 69 is tightened so that the focus adjusting rod 67 is loosened. When the cam section 52 is bent after the focus tracking adjustment, an internal stress is created in the cam section 52. However, the internal stress will be absorbed by means of the V-shaped grooves 55 formed at the inner sides of the ends of the cam section 52, thereby preventing the cam section 52 from being subjected to strain or deflection.

In the same manner as described in the previous embodiment in connection with FIG. 5, the rear lens means 2 is positioned at a desired axial position relative to the front lens means 1 without changing the distance between the axis of rotation of the bell crank member 8 and the adjusting pin 7e, so as to finely adjust the focus of the zoom lens system in the intermediate focal length range. Therefore, focusing errors are distributed on both sides of the predetermined contact point $Q_T$ or $Q_W$ according to the rotational movement of the cam member 50 in the intermediate focal length range and, therefore, tend to fall within acceptable limits.

It should be understood that the present invention can be embodied in retrofocus-type zoom lens systems with the same result.

Although the present invention has been described in association with a collapsible-type camera with a telephotographic-type zoom lens in which the first and second lens means are moved forward to provide a long focal length, it is applicable to a collapsible-type camera with a retrofocus-type zoom lens in which the first and second lens means are moved rearward to provide a long focal length.

What is claimed is:

1. A drive mechanism for a zoom lens system having first and second lens means, comprising:
   a fixed barrel,
   a movable lens barrel fixedly holding said first lens means,
   cam means comprising a cam member carried by said fixed barrel,
   a cam follower member on said movable lens barrel;
   means mounting said movable lens barrel for forward or rearward movement in said fixed barrel to shift said second lens means forward or rearward relative to said first lens means along the optical axis of said zoom lens system under the influence of said cam member so as continuously to change the focal length o said zoom lens system; and
   means mounting said cam member for rotation on said fixed barrel about an axis on which lies the intersection of lines normal to a cam surface of said cam member at the contact points of said cam follower member with said cam surface when said zoom lens system has its longest and its shortest focal lengths, respectively, in order to change the focus of said zoom lens system in an intermediate focal length range.

2. A zoom lens system drive mechanism as defined in claim 1, wherein said cam member is formed with a pair of circular-arcuate guide slots having their center at said intersection and center lines of said slots passing through said intersection meeting at approximately a right angle, each said guide slot receiving a guide pin extending from said fixed barrel.

3. A zoom lens drive system as defined in claim 2, wherein said cam member is formed with a radially extending slot slidably receiving a pin member which extends from and is eccentric to a disk member rotatably mounted on said fixed barrel.

4. A drive mechanism for a zoom lens system having first and second lens means, comprising:
   a movable lens barrel fixedly holding said first lens means,
   cam means comprising a cam member formed with a cam surface on one side and a cam follower member on said movable lens barrel;
   means mounting said movable lens barrel for forward or rearward movement to shift said second lens means forward or rearward relative to said first lens means along the optical axis of said zoom lens system under the influence of said cam member so as continuously to change the focal length of said zoom lens system; and
   said cam member being radially bendable at its middle section so as to deform said cam surface, thereby changing the focus of said zoom lens system in an intermediate focal length range.

5. A zoom lens system drive mechanism as defined in claim 4, wherein said cam member is shaped substantially in the form of a triangular frame one side of which is formed with a cured cam surface, said one side being bendable.

6. A zoom lens system drive mechanism as defined in claim 5, wherein said one side formed with said cam surface is formed with grooves adjacent opposite ends of said cam surface to facilitate the bending thereof.

7. A drive mechanism for a zoom lens system having first and second lens means, comprising:
   a fixed barrel;
   a movable lens barrel holding said first lens means;
   cam means comprising a cam member carried by one of said fixed barrel and said movable lens barrel;
   a cam follower member on the other of said fixed barrel and said movable lens barrel;
   means mounting said movable lens barrel for forward or rearward movement in said fixed barrel to shift said second lens means forward or rearward relative to said first lens means along the optical axis of said zoom lens system under the influence of said cam member so as continuously to change the focal length of said zoom lens system; and
   means mounting said cam member for rotation on said one of the barrels about an axis on which lies the intersection of lines normal to a cam surface of said cam member at the contact points of said cam follower member with said cam surface when said zoom lens system has its longest and its shortest focal lengths, respectively, in order to change the focus of said zoom lens system in an intermediate focal length range.

8. A drive mechanism for a zoom lens system having first and second lens means, comprising:
   at least two barrels, at least one of said barrels holding said first lens means;
   cam means comprising a cam member carried by one of said barrels;
   a cam follower member on the other of said barrels;
   means mounting one of said barrels for forward or rearward movement in the other of said barrels to shift said second lens means forward or rearward relative to said first lens means along the optical axis of said zoom lens system under the influence of said cam member so as continuously to change the focal length of said zoom lens system; and
   means mounting said cam member for rotation on said one of the barrels about an axis on which lies the intersection of lines normal to a cam surface of said cam member at the contact points of said cam follower member with said cam surface when said zoom lens system has its longest and its shortest focal lengths, respectively, in order to change the focus of sari zoom lens system in an intermediate focal length range.

* * * * *